US009755985B1

(12) United States Patent
Lutz et al.

(10) Patent No.: US 9,755,985 B1
(45) Date of Patent: Sep. 5, 2017

(54) UTILIZING MULTIPLE ALGORITHMS IN A DISTRIBUTED-SERVICE ENVIRONMENT

(75) Inventors: David A. Lutz, Renton, WA (US); Stefano Stefani, Issaquah, WA (US); Jakub Kulesza, Bellevue, WA (US); Timothy Andrew Rath, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 679 days.

(21) Appl. No.: 12/892,527

(22) Filed: Sep. 28, 2010

(51) Int. Cl.
*G06F 15/173* (2006.01)
*H04L 12/863* (2013.01)

(52) U.S. Cl.
CPC .............................. *H04L 47/6255* (2013.01)

(58) Field of Classification Search
CPC .................................................. H04L 47/6255
USPC ......................................................... 709/223
See application file for complete search history.

(56) References Cited

U.S. PATENT DOCUMENTS

| 7,295,516 | B1 * | 11/2007 | Ye ........................... H04L 47/10 370/232 |
| 2004/0215753 | A1 * | 10/2004 | Chan et al. ................... 709/223 |
| 2005/0204184 | A1 * | 9/2005 | Endo ................................. 714/4 |
| 2008/0008094 | A1 * | 1/2008 | Gilfix ........................... 370/235 |
| 2009/0193141 | A1 * | 7/2009 | Suresh ........................... 709/235 |
| 2010/0083145 | A1 * | 4/2010 | Schang et al. ................ 715/760 |
| 2010/0268798 | A1 * | 10/2010 | Kourkouzelis et al. ...... 709/220 |

* cited by examiner

*Primary Examiner* — Kevin Mai
(74) *Attorney, Agent, or Firm* — Lee & Hayes, PLLC

(57) ABSTRACT

Techniques for producing a gentle reduction in throughput in a distributed service when a node of the service encounters a very large backlog of requests and/or when a previously offline node of the service is brought back online. These techniques may utilize multiple different algorithms to determine an amount of work that the distributed service is able to accept at any given time, rather than a single algorithm.

30 Claims, 7 Drawing Sheets ated in different figures indicates similar or identical
UTILIZING MULTIPLE ALGORITHMS IN A DISTRIBUTED-SERVICE ENVIRONMENT

BACKGROUND

Distributed-service environments may include multiple different nodes that each replicate work that each other node performs. For instance, a distributed storage service may include multiple different storage servers, each of which stores a user's data in response to receiving storage requests from the user. In some instances, these different storage servers reside geographically remote from one another, thus protecting the user's data in the event of an outage or catastrophic event at one of the geographic locations.

In another example, a distributed computational service may include multiple different computational servers. Each of these computational servers may compute requested computational problems for the purpose of verifying the computed results with each other computational service. Many other distributed-service environments exist, with these environments including multiple different entities that each perform and replicate operations requested by a user or other entity.

In some instances, the entities that perform the requested operations may desire to generally remain caught up with one another. For instance, when a user requests to store a large batch of data on a distributed storage service, the distributed storage service may attempt to ensure that none of the replicated storage nodes has a backlog of storage requests to process that is grossly larger than a backlog of the other replicated storage nodes. While the distributed storage service may simply stop receipt of user requests to allow the backlogged storage node to catch up, such a solution may prove grating to the user of the distributed service.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
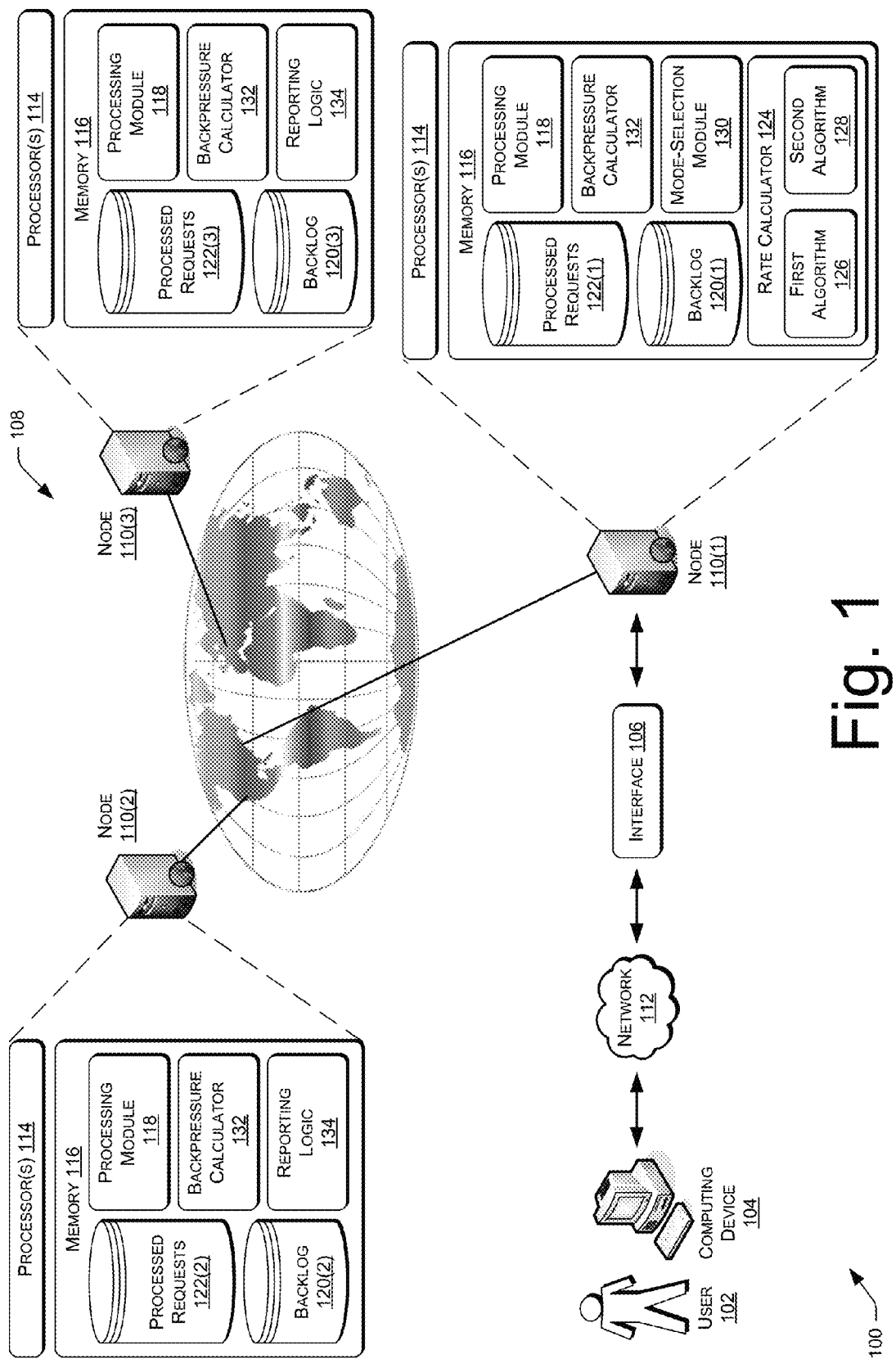
FIG. 1 illustrates an example environment in which a user operates a computing device to send requests to a distributed service. The distributed service includes logic for producing a gentle reduction in throughput in the eyes of the user when, for example, a previously offline node of the service is brought back online.

This disclosure describes, in part, systems and techniques for producing a gentle reduction in throughput in a distributed service when a node of the service encounters a very large backlog of requests and/or when a previously offline node of the service is brought back online. To do so, the systems and techniques may utilize multiple different algorithms to determine an amount of work that the distributed service is able to accept at any given time, rather than a single algorithm.

For example, when each node of the distributed service is functioning normally, the service may utilize a first algorithm that accepts an amount of work that each replication node is able to perform without falling too far behind each other node that is also performing the work. When, however, a node encounters a very large backlog of work, or when the node is brought back online after being offline for a certain amount of time, the distributed service may utilize a different algorithm for determining an amount of work to accept into the service. For instance, the service may utilize an algorithm that smoothes out a drop in throughput in these scenarios, as contrasted with simply stopping all incoming requests into the service, as the first algorithm may require and as discussed above. By smoothing the drop in throughput in this manner, the service provides a more consistent and less jarring experience to a user that provides the requests.

Any form of distributed service may utilize the systems and techniques described below. For instance, these systems and techniques may apply to distributed storage services, distributed computational services, or any other service that determines an amount of work to accept into the service while ensuring that each node of the service that performs the work is generally caught up with each other node. In one of many additional examples, these techniques may apply to distributing work to a group of human workers, where the service desires that each human worker processes the work at approximately the same time as each other worker and/or without falling too far behind each other worker.

The discussion begins with a section entitled "Example Environment" that describes an example environment that may implement the techniques introduced above. Next, a section entitled "Example Processes" follows, and describes example processes for gently reducing throughput in the distributed-service environment of FIG. 1 when a node of the service encounters a large backlog and/or is brought back online. Finally, the discussion ends with a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 illustrates an example environment 100 that may implement the described techniques. The environment 100 includes a user 102 operating a computing device 104 to access an interface 106 of a distributed service 108. For instance, the user 102 may employ a desktop computer (as illustrated), a laptop computer, a portable digital assistant (PDA), or any other computing device to access the interface 106 of the service 108. The interface 106, meanwhile, may represent a web interface or any other technology suitable to allow the user 102 to access services of the distributed service 108.

As illustrated, the user 102 may access the interface 106 over a network 112, which is representative of any one or combination of multiple different types of networks, such as the Internet, cable networks, cellular networks, wireless networks, and wired networks. The network 112 may be a public or a private network. Furthermore, while FIG. 1 illustrates several arrows, each of the illustrated services may communicate directly or indirectly with one another via the network 112 or via a different network.

The distributed service 108 may comprise a storage service, a computational service, or any other service that processes requests from the user 102 or from any other entity at one or more nodes, such as nodes 110(1), 110(2), and 110(3). For instance, the distributed service 108 may comprise a distributed storage service that receives a request to store data from the user 102 (e.g., via PUT requests) and, in response, replicates the data at each of the three geographically distributed nodes 110(1)-(3). While FIG. 1 illustrates that the service 108 uses three nodes to process the requests from the user 102, other implementations may employ any other greater or lesser number of nodes. Furthermore, while FIG. 1 illustrates that the nodes 110(1)-(3) of the distributed service 108 may reside geographically remote from one another, other implementations may employ nodes that reside closer to one another, such as at a common geographical location or even in a common housing of a computing device. That is, the distributed service 108 may comprise multiple large-scale data centers having nodes situated across the globe, a single computer that includes multiple different queues (or "nodes"), or any other environment there between.

As illustrated, in this example each of the nodes 110(1)-(3) of the distributed service 108 is embodied as one or more servers that collectively have processing and storage capabilities. These servers may be embodied in any number of ways, including as a single server, a cluster of servers, a server farm or data center, and so forth, although other server architectures (e.g., mainframe) may also be used. Each of the nodes 110(1)-(3), includes one or more processors 114 and memory 116. The memory 116 is an example of computer-readable media and may include volatile and nonvolatile memory. Thus, the memory 116 may include, but is not limited to, RAM, ROM, EEPROM, flash memory, or other memory technology.

The distributed service 108 may utilize a single master system, a multi-master system, or any other configuration. In the illustrated example, the distributed service 108 utilizes a single master system, where the node 110(1) comprises a master node and the nodes 110(2) and 110(3) comprise non-master nodes (at least as far as requests received from the user 102 are concerned). As such, the node 110(1) may receive the requests from the user 102 via the interface 106 and may distribute these requests to the nodes 110(2) and 110(3). While FIG. 1 illustrates the node 110(1) as the master node, the designation of master node can change with time. That is, any one of the nodes 110(1)-(3) may comprise the master node at a certain point in time and, hence, each of the nodes 110(2) and 110(3) may include the functionality illustrated and described with reference to the node 110(1).

In some instances, each node including the master node comprises a replication node that performs the request. As such, each of the nodes 110(1)-(3) illustrated in FIG. 1 may store a processing module 118 for processing requests received from the user 102 at the interface 106 of the distributed service 108. For instance, in examples where the distributed service 108 comprises a storage service, the processing module 118 may comprise logic suitable to receive the requests and store the data in a corresponding database of the node. In this regard, each of the nodes 110(1)-(3) may include a database of backlogged requests 120(1), 120(2), 120(3) (or "backlogs 120") as well as a database of processed requests 122(1), 122(2), 122(3) (or "processed requests 122"). The backlogs 120(1)-(3) of the respective nodes 110(1)-(3) represent those requests received from the user that the respective node has yet to process. For instance, the backlog may consist of sequential PUT requests (i.e., requests to write data) that the node has yet to act upon. The processed requests 122(1)-(3), meanwhile, represent those requests that the respective node has processed. As such, in one example the processed requests represent the data of the user 102 that has been stored at the respective node, as the user 102 requested.

The memory 116 of the master node 110(1), meanwhile, may store a rate calculator 124. The rate calculator 124 functions to determine a rate at which the distributed service 108 is able to accept work from the user 102 into the system. As a general constraint, the rate calculator 124 may allow the user to provide as many requests into the service as the service is able to perform without becoming unduly congested or behind. That is, the rate calculator may desire to maximize the number of request per second (RPS) that the user 102 is able to inject into the system, while meeting a quality of service (QoS) agreement with the user 102 or otherwise providing a reliable and positive experience to the user 102.

To determine this rate, the rate calculator 124 may store or otherwise have access to multiple different algorithms, such as first and second algorithms 126 and 128. While FIG. 1 illustrates that the calculator 124 employs two algorithms, this calculator may employ any other number of algorithms in other embodiments.

FIG. 1 further illustrates that the master node 110(1) may also store or otherwise have access to a mode-selection module 130. The mode selection module 130 may allow the node 110(1) to determine which of multiple different modes the service 108 should operate in at any given time. In some instances, the peer nodes determine which mode to operate in, while in other instances the master node makes this determination. The rate calculator 124, meanwhile, may select to calculate the rate (e.g., RPS) with reference to the selected mode.

For instance, when each of the replication nodes 110(1)-(3) is online and successfully processing the requests received from the user, the node 110(1) may operate in a normal operational mode. A normal operational mode may be defined, in some instances, as a mode in which each replication node has a backlog that is below a threshold amount. In this mode, the rate calculator 124 may calculate the acceptable rate of incoming work with reference to the first algorithm 126. The first algorithm 126 may be based, in whole or in part, on the backlogs of the replication nodes 110(1). As discussed in detail below, the first algorithm 126 may instruct the rate calculator 124 to determine an acceptable RPS for the service 108 based on a node of the replication nodes 110(1)-(3) having a highest backlog of unprocessed requests. As the backlog of the highest-backlog node grows, the acceptable rate of incoming work calculated with reference to the first algorithm may decrease. The rate calculator 124 may re-calculate this accept rate periodically, such as four times a second or at any other suitable rate.

In instances where at least one of the replication nodes 110(1)-(3) was recently brought back online and/or in instances where at least one backlog of the replication nodes 110(1)-(3) has grown beyond a threshold limit, meanwhile, this node may be said to be "in recovery" or in "recovery mode." Further, when at least one node of the distributed service is in recovery (and, hence, in recovery mode), the distributed service 108 may be said to also be in a "recovery mode." As such, either or both of the individual nodes may be said to be in a recovery mode when a backlog of a node is sufficiently high and/or when a node comes back online. When in the recovery mode, the rate calculator 124 may calculate an acceptable rate to receive requests with reference to the second algorithm 128. Like the first algorithm, the second algorithm 128 may take into account the backlogs 120(1)-(3) of the replication nodes 110(1)-(3). However, the second algorithm may further serve to set and periodically adjust a cap to this initial calculation for the purpose of ensuring that the recovering node eventually catches up to the other replication nodes. In this manner, the second algorithm provides a gentle decrease in throughout in the eyes of the user 102, while still allowing the recovering node to catch up. For instance, the second algorithm may include calculating an initial rate with reference to a highest backpressure of those nodes that are not in recovery, and then determining a cap to impose upon this initial rate with reference to whether a largest backlog of any nodes in recovery is growing or shrinking. This rate (and cap) may then be periodically adjusted in a similar manner. Both the first algorithm 126 and the second algorithm 128 are discussed in detail below.

Each of the replication nodes 110(1)-(3) may further store a backpressure calculator 132, while the non-master nodes 110(2) and 110(3) may also store or otherwise implement reporting logic 134. The backpressure calculator 132 allows each node to calculate a respective backpressure that the respective node currently experiences, with this backpressure being based at least in part on the respective backlog 120(1)-(3) of the node 110(1)-(3) and/or based on other load describing metrics, such as latency, input/output (TO) saturation, the health of other functionality that the service provides that compete for the same resources, and the like. Typically, the larger the backlog of a node, the larger the corresponding backpressure.

The reporting logic 134, meanwhile, functions to report this calculated backpressure to the master node 110(1) in instances when the respective non-master node 110(2)-(3) is not in "recovery mode." The master node 110(1) then uses these reported backpressures (along with its own calculated backpressure) to determine a rate at which the distributed service 108 is able to accept the requests from the user 102.

When a non-master node 110(2)-(3) is in recovery mode, meanwhile, the respective node may instead provide an indication of which serial request the respective node is currently processing, such as a log sequence number (LSN) of the request. The master node 110(1) may then use this information to determine whether the backlog of the recovering node is shrinking with time and, hence, whether or not to set a cap on the acceptable rate of requests, as calculated with reference to the backpressures of the other, non-recovering nodes. The master node 110(1) may also use this to determine whether to tighten or relax the cap after the setting the cap, depending upon whether or not the recovering node is catching up or not. Each replication node may transition to recovery mode from a normal operational mode upon being brought back online (after having been offline) or in response to accumulating a respective backlog that is greater than a threshold limit. Further, each replication node may transition back to normal operational mode when the respective backlog returns to less than the threshold for a predetermined amount of time (e.g., for a certain consecutive number of samples).

As described in detail below with reference to the example processes, the environment 100 of FIG. 1 provides a distributed service 108 that gently reduces throughput of a distributed service in the event of an outage or other difficulty involving a node of the service.

Example Processes

Figure 2A:
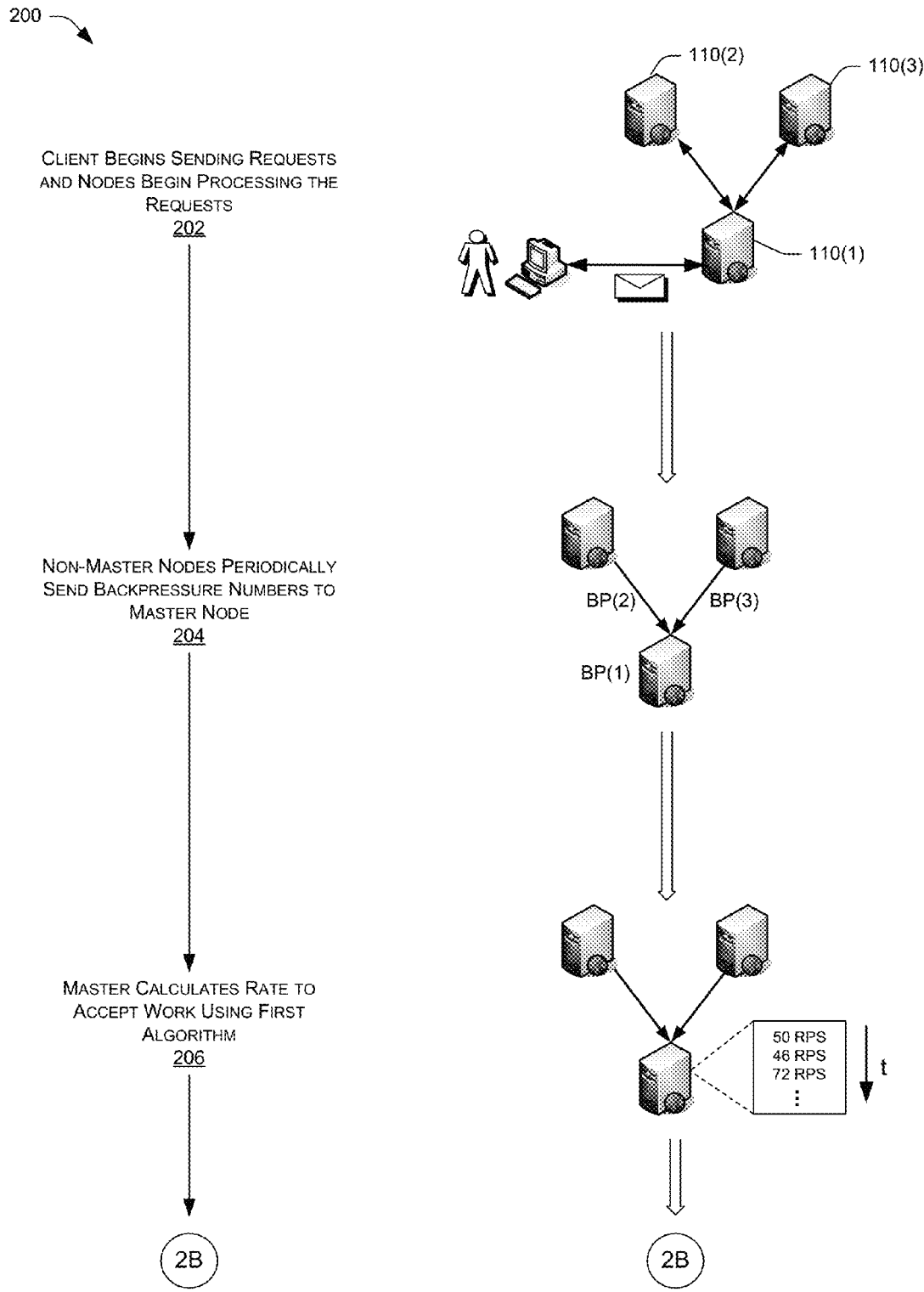
FIGS. 2A-C illustrate an example process that the distributed service of FIG. 1 may implement for the purpose of utilizing at least two different algorithms for calculating a rate at which the distributed service is able to accept work.
Figure 2B:
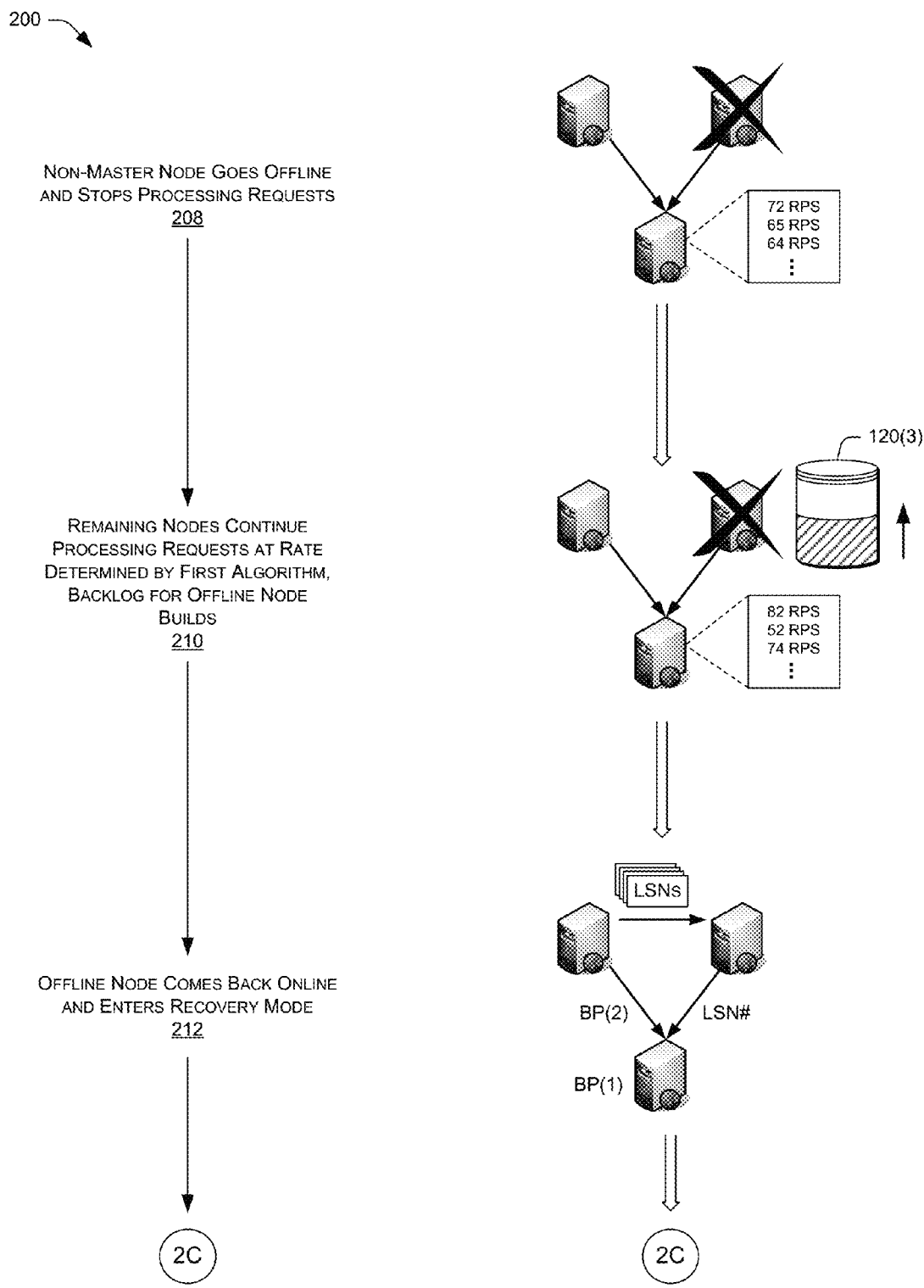
Figure 2C:
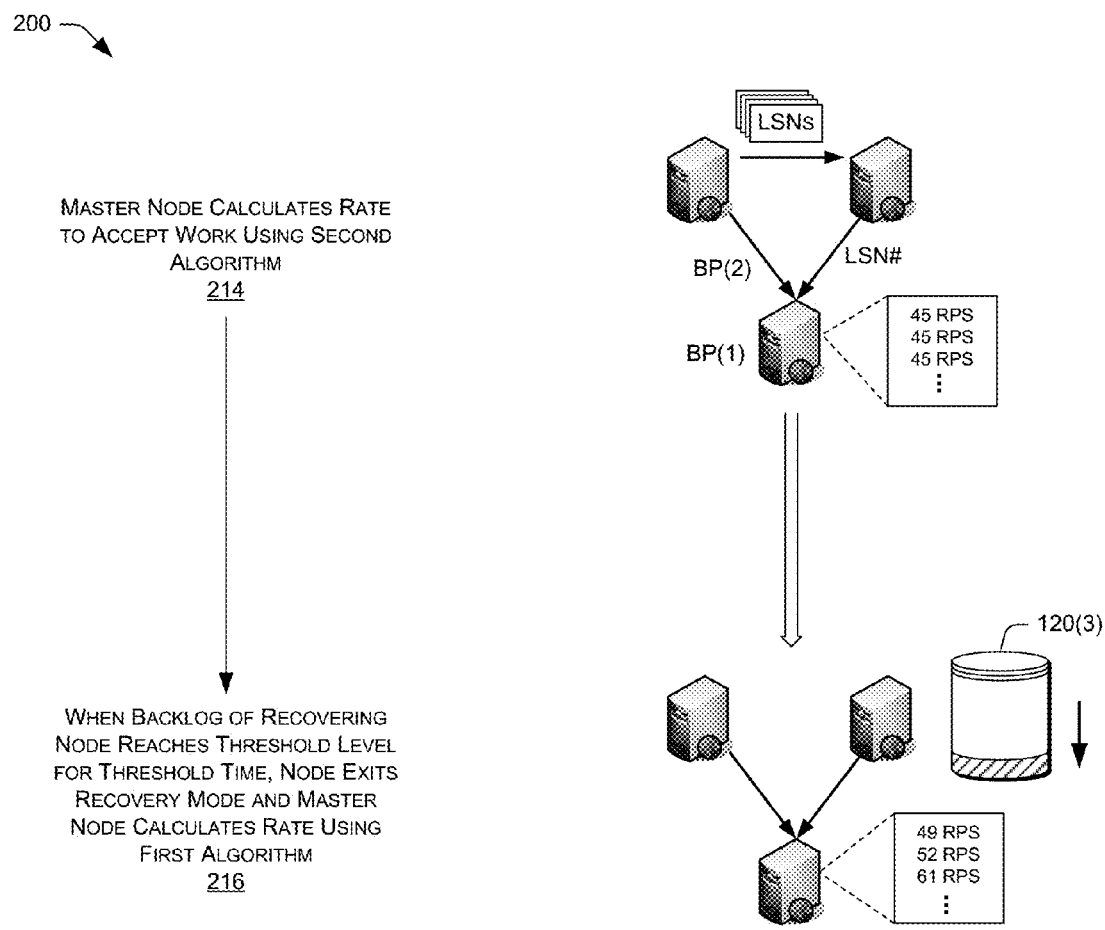

FIGS. 2A-C illustrate an example process 200 that the distributed service 108 of FIG. 1 may implement for the purpose of utilizing at least two different algorithms for calculating a rate at which the distributed service is able to accept work. This process (as well as other processes described throughout) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 200 (and the other processes) is described with reference to the environment 100 of FIG. 1, although other environments may implement this process.

The process 200 includes, at act 202, a client of the distributed service 108 beginning to send requests to the service and, in response, the service 108 beginning process the requests. This act may include, for example, the user 102 injecting a series of PUT requests into a distributed storage service, the user 102 injecting a series of computational requests into a distributed and replicated computational service, or the user 102 or another entity sending any other form of request to any other distributed service.

Act 204 represents that the non-master nodes 110(2)-(3) may periodically send backpressure numbers to a master node 110(1) of the distributed service. As discussed above, each of these non-master nodes may calculate the node's respective backpressure with reference to the backlog 120(1)-(2) of the respective node, possibly amongst other factors. In addition, the master node may itself calculate its own backpressure number.

At act 206, the master node 110(1) periodically calculates a rate at which to accept work (e.g., requests) into the service 108 using the first algorithm 126. As described above, the first algorithm references the backpressures (and, hence, backlogs) of the nodes to determine a maximum amount of work (e.g., a maximum number of RPS) that the service can safely accept into the system at a given moment. This rate may vary as the backpressures of the nodes themselves vary. In some instances, the master node 110(1) calculates an amount of work that a node having a highest backpressure can handle and then sets this amount of work as the rate at which the service 108 as a whole can accept work from the user 102. The service 108 may or may not message to the user 102 the rates at which the service 108 currently accepts work. Further, when the user 102 provides an incoming request rate that is higher than a currently calculated rate, the service may respond to the user 102 with an error message (e.g., a "503 service unavailable" error message) and/or may employ multiple different load shedding techniques.

The process 200 continues on FIG. 2B with act 208. This act represents a non-master node 110(3) of the group of nodes of the service 108 going offline. This node may go offline for maintenance, due to a power outage at a data center that hosts the node, due to a catastrophic event on the node or at the geographical location of the data center, or for any other reason. In any event, act 208 represents that the example node goes offline and ceases processing the requests received into the system, at least temporarily.

At act 210, the remaining nodes assigned to process the requests continue to process the requests, just as they did prior to the node going offline. In this example, for instance, the nodes 110(1) and 110(2) continue to process the received requests, while the master node continues to periodically calculate a rate at which to accept incoming work into the system with reference to the first algorithm 126. Therefore, the non-master node 110(2) continues to calculate and provide its backpressure to the master node 110(1), which continues to calculate the acceptable rate of incoming work with reference to the backpressure of the node 110(2) and its own backpressure. In other words, because the node 110(3) is offline, it is no longer reporting information (e.g., backpressure, log sequence number (LSN), etc.) to the master node 110(1). As such, the master node 110(1) may calculate the rate at which to accept incoming work with reference to the backpressures of the nodes 110(1) and 110(2) alone. In other implementations, however, the master node 110(1) may choose to alter this rate in response to determining that the node 110(3) has gone offline or is otherwise in recovery. For instance, the master node 110(1) may lower the rate by a certain percentage, may set a not-to-exceed cap on the calculated rate, or may alter the rate in any other manner.

In either instance, because the offline node 110(3) still needs to replicate the processing the of the requests, the backlog 120(3) of this node 110(3) continues to build with time as the user 102 injects more and more requests into the service 108. While FIG. 2 illustrates the actual backlog 120(3) building, in some instances the backlog does not actually physically receive the injected requests, due to the node 110(3) being offline. Instead, the node 110(3) may send a request for the requests that the node 110(3) missed to one of its peer nodes, as discussed below.

Sometime after going offline, the node 110(3) may come back online and may begin the process of catching up to the other two nodes 110(1) and 110(2) at act 212. Upon coming back online, the node 110(3) may automatically enter into "recovery mode." Alternatively, the node 110(3) and/or the master node 110(1) may determine whether the backlog 120(3) is greater than a threshold value when the node 110(3) comes back online and, if so, may place the node 110(3) in the recovery mode. If, however, the backlog 120(3) is less than the threshold amount, then the node 110(3) may remain in normal operational mode.

When in the recovery mode, the node 110(3) may send a request to a peer node (e.g., the node 110(2)) for the requests that the user 102 provided while the node 110(3) was offline. FIG. 2 illustrates that the node 110(2) may provide batches of these requests in response. In the illustrated example, the requests comprise sequential requests that each node 110 (1)-(3) processes in order, with reference a log sequence number (LSN) or other identifier of the request. As such, the node 110(2) may provide to the node 110(3) the LSNs injected into the system while the node 110(3) was offline. In addition, while the node 110(3) attempts to catch up by working through the LSNs received from the node 110(2), the node 110(3) periodically provides to the master node 110(1) the LSN of the most recently processed request. As discussed below, the master node 110(1) may use this information to determine whether the node 110(3) is in fact catching up, or whether the node 110(3) is getting further and further behind the master node 110(1).

FIG. 2C continues the illustration of the process 200 when the node 110(3) is in the recovery mode. At act 214, and in response to the node 110(3) entering recovery mode, the master node 110(1) begins calculating a rate at which to accept requests from the user 102 with reference to the second algorithm. The second algorithm uses the backpressures of the non-recovering nodes as a baseline for calculating the rate, before capping this rate and adjusting this cap based on whether or not the recovering node 110(3) is catching up with time.

If the master node 110(1) were to continue to calculate the rate at which the service 108 can accept work strictly with reference to the first algorithm, the instantaneous change in this rate upon entry of the node 110(3) may be quite jarring to the user 102. That is, if the node 110(3) has a large backlog 120(3) to work through after being offline for some time, then the node 110(3) will likely calculate a large backpressure number. Using the first algorithm, the master node 110(1) would calculate a rate that is near zero RPS or the minimum guaranteed throughout, based on the immense backpressure of the node 110(3). This experience may be particularly unpleasant to the user 102, given that the user 102 most likely didn't realize that the node 110(3) was even offline.

In the current example, however, the master node 110(1) may utilize the backpressure of the non-recovering nodes (and not the recovering node) to set a baseline rate for accepting work into the system. For instance, the master node 110(1) may initially calculate a rate based on a current backpressure of the node 110(2) and its own backpressure. In addition, the master node 110(1) may determine a difference between the LSN most recently processed by the recovering node 110(3) and the most recent LSN injected into the system (i.e., the leading edge). This difference may represent a gap between the recovering node 110(3) and the leading edge—that is, how far behind the recovering node 110(3) is from the master node 110(1).

After a certain time period, the recovering node 110(3) may again send the LSN of the most recently processed request, which the master node 110(1) may again compare to the leading edge to determine whether the gap between the recovering node 110(3) has shrank or grown. In the latter instances, the master node 110(1) may set a cap of the acceptable rate determined with reference to the backpressures and may again compute the gap between the recovering node 110(3) and the master node 110(1). If the gap has widened, then the master node 110(1) may tighten the cap. If, however, the gap has lessened, then the master node 110(1) may relax the cap. In this manner, the user 102 does not experience an instantaneous drop in a number of accepted requests (e.g., RPS). Instead, the user 102 experiences a smooth reduction in the number of accepted requests as the recovering node 110(3) attempts to catch up to the non-recovering node.

At act 216, the node 110(3) exits the recovery mode when the backlog 120(3) of the node 110(3) is less than a threshold level for a threshold amount of time. This threshold amount of time may comprise absolute time (e.g., zero or more seconds) or a number of consecutive sampling periods in which the backlog of the node 110(3) was less than the threshold amount. At this point, the distributed service 108 returns to normal operational mode and the master node 110(1) again calculates an acceptable rate of incoming work with reference to the first algorithm.

Figure 3:
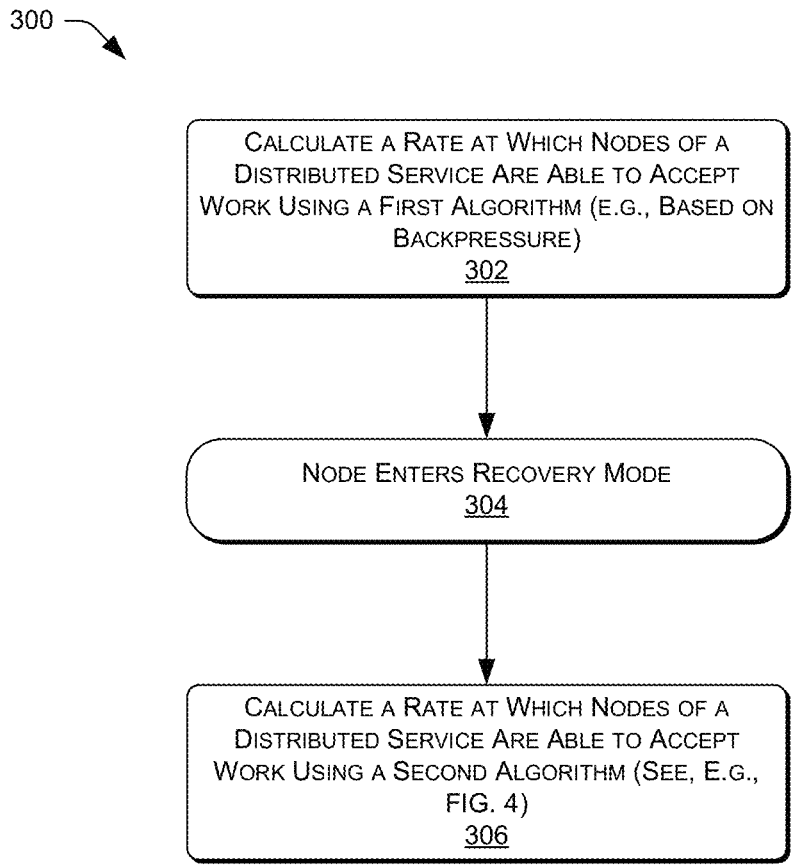
FIG. 3 is a flow diagram of another example process that the distributed service may implement for utilizing two different algorithms for the purpose of gently reducing throughput when a node is brought back online or otherwise has a large backlog of requests (i.e., when a node is in "recovery mode").

FIG. 3 is a flow diagram of another example process 300 that the distributed service 108 may implement for utilizing two different algorithms for the purpose of gently reducing throughput when a node is brought back online or otherwise has a large backlog of requests (i.e., when a node is in "recovery mode").

First, at act 302 the distributed service 108 (e.g., via the master node 110(1)) calculates a rate at which the nodes 110(1)-(3) of the distributed service 108 are able to accept work using a first algorithm. For instance, this first algorithm may be based on backpressure, which in turn is based on a backlog of the nodes 110(1)-(3), as discussed above. Next, at act 304 a node enters a recovery mode. The node may enter the recovery mode in response to being brought back online and/or in response to a backlog of unprocessed requests of the node exceeding a threshold amount (e.g., for a threshold amount of time or otherwise).

At act 306 and in response to the node entering the recovery mode, the distributed service 108 (e.g., via the master node 110(1)) calculates a rate at which the nodes 110(1)-(3) of the distributed service 108 are able to accept work using a second algorithm that differs at least in part from the first algorithm.

Figure 4:
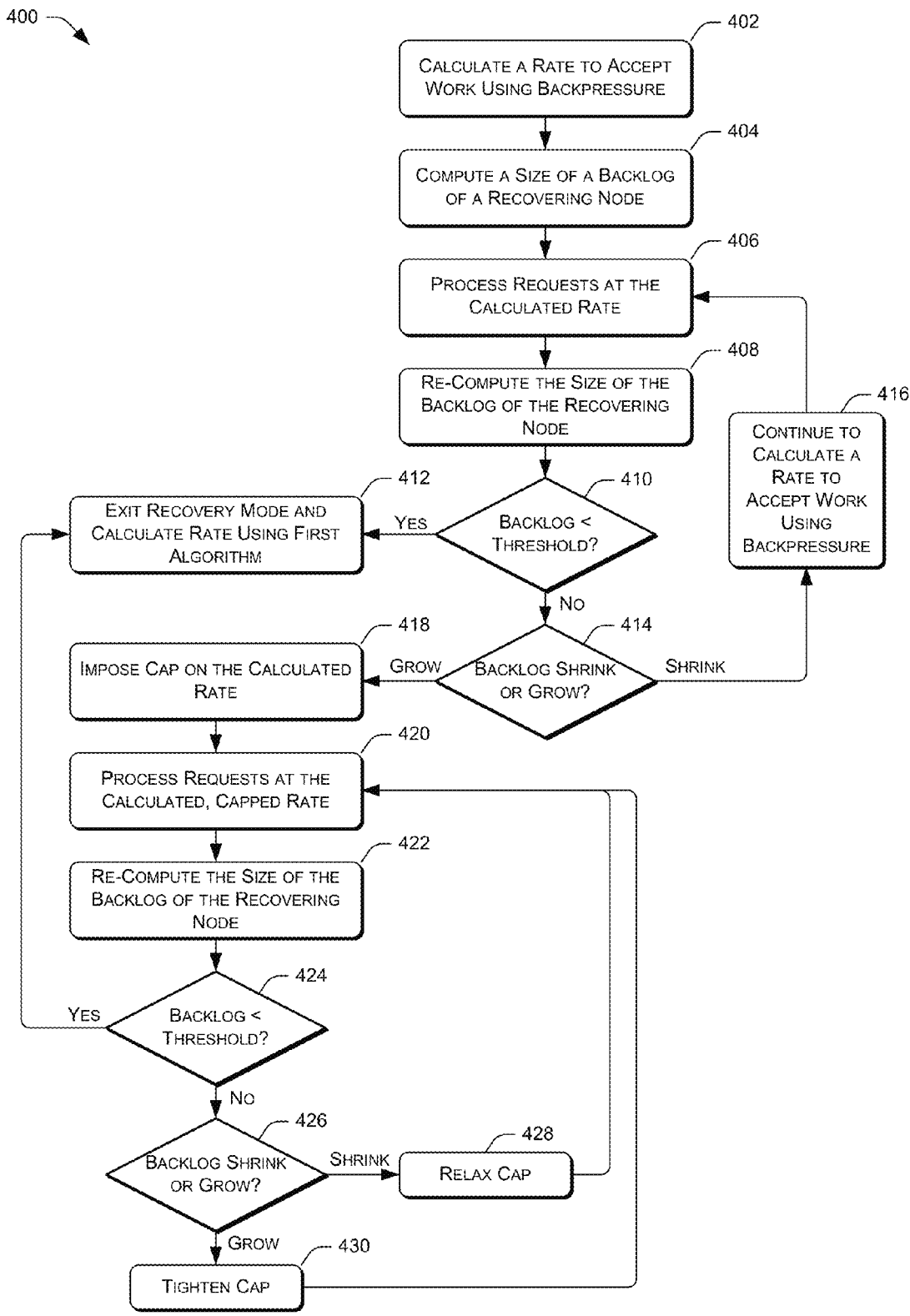
FIG. 4 is a flow diagram of an example process that the distributed service may implement when calculating a rate at which the distributed service is able to accept work when a node of the service is in recovery mode.

FIG. 4 is a flow diagram of an example process 400 of calculating a rate at which the distributed service is able to accept work using the second algorithm (e.g., when a node of the service is in recovery mode). While the process is described with reference to the master node 110(1), other entities may perform some or the entire process 400 in other implementations.

At act 402, the master node 110(1) calculates a rate to accept work into the distributed service 108 based at least in part on backpressures calculated for the replicated and non-recovering nodes 110(1)-(2). Next, at act 404 the master node 110(1) computes a size of the backlog of the recovering node 110(3). In one example, the master node performs this computation by determining a difference between the LSN most recently processed by the recovering node and the LSN most recently injected into the service 108 by the user 102.

Next, at act 406, the master node 110(1) and the other nodes of the group process the received requests, allowing for the maximum rate calculated at act 402. After doing so, the master node 110(1) re-computes the backlog of the recovering node at act 408 to determine, in part, whether this backlog has grown or shrank when using the initially calculated rate that was based on the backpressure of the non-recovering nodes.

Before making this determination, however, the master node 110(1) may determine, at decision block 410, whether the re-computed backlog of the recovering node is less than a threshold backlog amount (potentially for a threshold amount of time). If so, then the recovering node has already caught up and the recovering node exits recovery mode at act 412. In addition, the master node 110(1) returns to calculating the acceptable rate of incoming requests with reference to the first algorithm.

If, however, the re-computed backlog of the recovering node is not less than the threshold (or not less than the threshold for the threshold amount of time), then the master node compares, at decision block 414 the initially computed backlog with the re-computed backlog to determine whether the backlog grew or shrank. If the master node 110(1) determines that the backlog actually shrank, then the node 110(1) may determine that the rate initially calculated at act 402 did not prohibit the recovering node 110(3) from making headway into the backlog of the recovering node. As such, at act 416 the master node may continue to calculate the rate at which to accept work into the service with reference to the backpressure of the non-recovering nodes. While FIG. 4 illustrates that the decision block 414 determines whether the backlog grew or shrank, in some implementations this decision block queries whether the backlog grew or shrank by certain threshold amount(s).

Returning to the process 400, when the master node 110(1) determines that the backlog of the recovering node 110(3) actually grew between the computation and the re-computation of the backlog, then the master node may impose a cap on the calculated rate at which to accept incoming work at act 418. In some instances, the master node 110(1) caps the most recent calculated rate (i.e., the rate calculated at act 402), while in other instances the master node 110(1) caps a weighted average of a certain number of most recent calculated rates. In some instances, the master node 110(1) applies the cap to an exponential weighted average going back a predetermined amount of time. Further, in instances where multiple nodes of the group are in the recovery mode, the process 400 may determine and set the cap with reference to the node in recovery that is furthest behind (i.e., has a largest backlog). Of course, the designation of the furthest-behind node can change between cycles.

After imposing the cap on the calculated rate, at act 420 the distributed service 108 processes receives requests according to the calculated and capped rate. At act 422 and after the processing of the requests, then master node 110(1) again re-computes the backlog of the recovering node 110(3) (e.g., with reference to an LSN most recently processed by the recovering node 110(3) and an LSN of the leading edge). At decision block 424, the master node 110(3) determines whether this re-computed backlog is less than the threshold amount (potentially for the threshold amount of time). If so, then the recovery node 110(3) exits the recovery mode as discussed above with reference to the act 412.

If, however the backlog is not less than the threshold (or hasn't been less than the threshold for the requisite amount of time), then the master node 110(1) determines at decision block 426 whether the backlog of the recovering node has grown or shrank in the last period of time. If the master node 110(1) determines that the backlog has shrank (and, hence, that the recovering node 110(3) is catching up to the non-recovering replicated nodes), then the master node 110(1) may relax the cap (e.g., by a certain percentage of the cap) at act 428.

If, however, the master node 110(1) determines that the backlog has grown (and, hence, that the recovering node 110(3) is not catching up to the non-recovering replicated nodes), then the master node 110(1) may tighten the cap (e.g., by a certain percentage of the cap) at act 430. It is noted that the master node 110(1) may all the while continue to calculate the baseline rate with reference to the backpressures of the non-recovering nodes, and that the master node 110(1) may set and adjust the cap based on a weighted average that includes the recently calculated rate. In addition, While FIG. 4 illustrates that the decision block 426 determines whether the backlog grew or shrank, in some implementations this decision block queries whether the backlog grew or shrank by certain threshold amount(s).

Regardless of whether the master node 110(1) relaxes or tightens the cap, the process 400 may proceed back to the act 420. Here, the distributed service 108 processes received requests at the calculated and capped rate. The master node 110(1) has either relaxed or tightened the cap at this point. The process 400 continues until the computed backlog of the recovering node is less than the threshold value (potentially for the threshold amount of time), at which point the node exits recovery mode and the master node returns to calculating the acceptable rate of incoming work with reference to the first algorithm 126, assuming that no other nodes remain in recovery mode.

Figure 5:
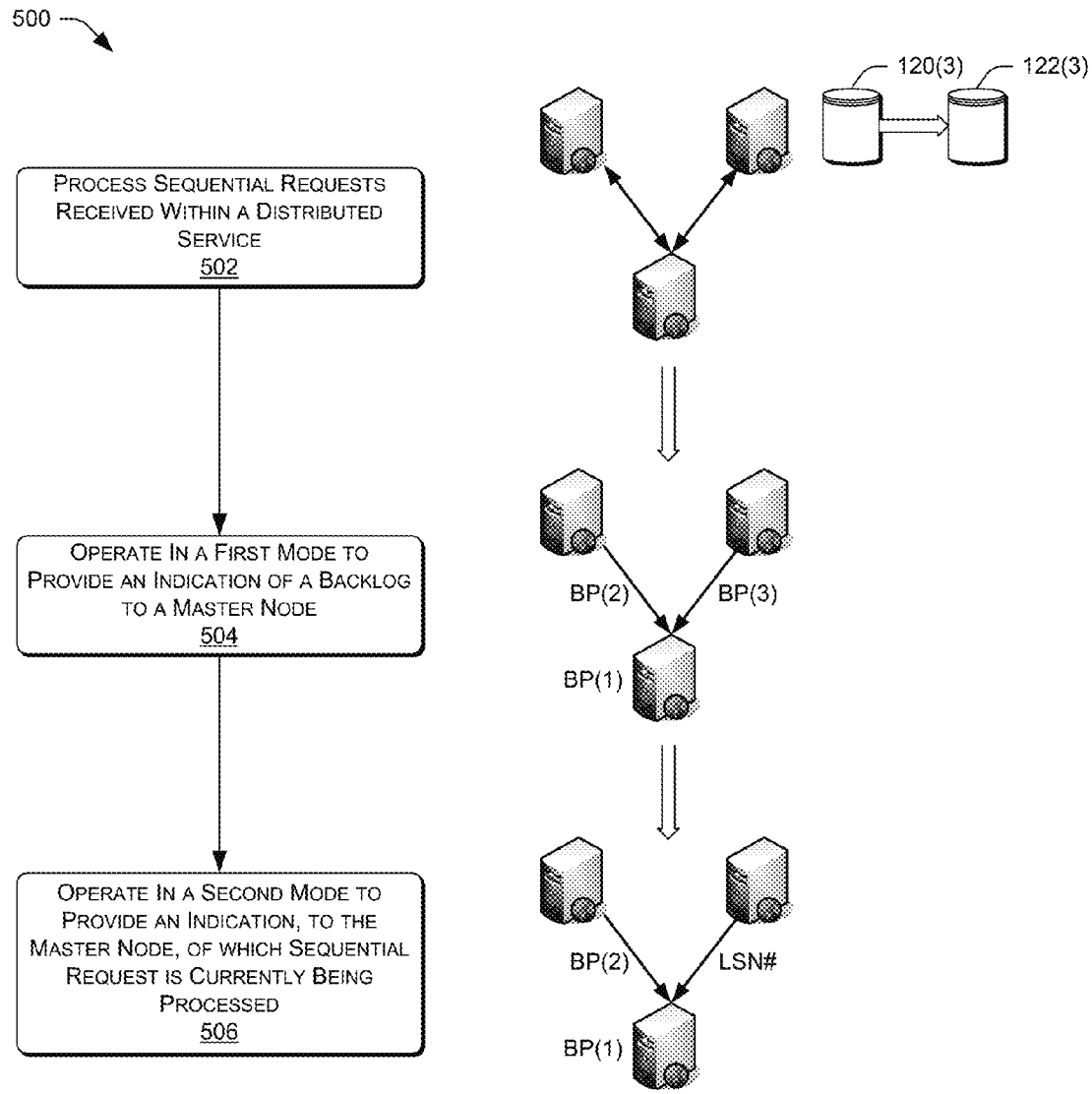
FIG. 5 is a flow diagram of an example process that a non-master node of the distributed service may implement. As shown, the non-master node may report different information to a master node of the service based on whether or not the non-master node is currently in recovery mode.

FIG. 5 is a flow diagram of an example process 500 that a non-master node of the distributed service 108 may implement. As shown, the non-master node may report different information to a master node of the service based on whether or not the non-master node is currently in recovery mode.

At act 502, the non-master node processes sequential requests received within the distributed service, just as each node of the group of nodes process the received requests. At act 504, the non-master node operates in a first mode, such as a "normal operational mode." In the first mode, the non-master mode may provide the backpressure calculation or other indication of a current backlog of the node to the master node. With this information, the master node may calculate at least a baseline rate for accepting requests into the distributed service.

At act 506, meanwhile, the non-master node transitions to operating in a second mode, such as a recovery mode. In the second mode, the non-master mode may function to provide, to the master node, an indication of which sequential request the non-master mode is currently processing. By providing this information, the master node is able to determine whether the backlog of the non-master node is growing or shrinking and, hence, whether to tighten or relax a cap on the acceptable rate of incoming work. By doing so, the distributed service provides for a gentle, rather than sharp, reduction in throughput from the viewpoint of a user providing requests to the distributed service.

While the process 500 describes the non-master node reporting different items based on a mode in which the node operates (e.g., backpressure in a first mode, LSN in a second mode), in other implementations the non-master node consistently reports the same information. For instance, the non-master node may report a backpressure and a current LSN (and/or other information) without regard to a current mode of the node. In these instances, the master node may utilize different pieces of the information at different times. For instance, when the non-master node is relatively caught up, the non-master node may utilize the received backpressure. However, in instances where the non-master node is behind (i.e., has a backpressure that is greater than a threshold value), the master node may utilize the LSN, even without the knowledge of the non-master node.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, when executed, cause one or more processors to perform acts comprising:
    calculating, for a group of replicated nodes that includes at least a first replicated node and a second replicated node, a maximum number of requests per second that the group of replicated nodes is able to accept based at least in part on at least one of a first backlog of the first replicated node and a second backlog of the second replicated node, wherein the first replicated node and the second replicated node in the group of replicated nodes replicates processing of a plurality of requests that the group of replicated nodes accepts;
    determining that the first backlog and the second backlog are both less than a threshold amount;
    based at least in part on the determining that the first backlog and the second backlog are both less that the threshold amount, continuing to calculate the maximum number of requests per second that the group of replicated nodes is able to accept; and
    at least partly in response to determining that the first backlog of the first replicated node is not less than the threshold amount:
        determining that the first replicated node is in a recovery mode;
        setting the maximum number of requests per second that the group of replicated nodes is able to accept while the first replicated node is in a recovery mode based at least in part on the second backlog of the second replicated node, the second backlog including a highest backlog from among backlogs of replicated nodes that are not in the recovery mode;
        computing a size of the first backlog of the first replicated node at a first time;
        re-computing the size of the first backlog of the first replicated node at a second, later time;
        comparing the first backlog of the first replicated node at the first time with the first backlog of the first replicated node at the second, later time to determine that the first backlog of the first replicated node has increased or decreased; and
        adjusting the maximum number of requests per second that the group of replicated nodes is able to accept based at least in part on determining that the first backlog of the first replicated node increased or decreased.

2. One or more non-transitory computer-readable media as recited in claim 1, wherein:
    the first replicated node and the second replicated node of the group of replicated nodes processes the plurality of requests sequentially according to a number associated with individual requests;
    the computing of the size of the first backlog at the first time comprises determining a difference between a number associated with a most recent request received at the first time and a number associated with a request processed by the first replicated node at the first time;
    the re-computing of the size of the first backlog at the second, later time comprises determining a difference between a number associated with a most recent request received at the second, later time and a number associated with a request processed by the first replicated node at the second, later time; and
    the comparing comprises determining that the difference at the first time is greater or less than the difference at the second, later time.

3. One or more non-transitory computer-readable media as recited in claim 1, further storing computer-executable instructions that, when executed, cause the one or more processors to perform an act comprising repeating the computing, the re-computing, and the adjusting until the first backlog is less than the threshold amount for a threshold amount of time.

4. One or more non-transitory computer-readable media as recited in claim 1, further storing computer-executable instructions that, when executed, cause the one or more processors to perform acts comprising:
  imposing a cap on the maximum number of requests per second that the group of replicated nodes is able to accept; and
  based at least in part on imposing the cap:
    relaxing the cap on the maximum number of requests per second that the group of replicated nodes is able to accept based at least in part on the first backlog of the first replicated node in the recovery mode decreasing; and
    tightening the cap on the maximum number of requests per second that the group of replicated nodes is able to accept based at least in part on the first backlog of the first replicated node in the recovery mode increasing.

5. One or more non-transitory computer-readable media as recited in claim 1, further storing computer-executable instructions that, when executed, cause the one or more processors to perform an act comprising:
  calculating a maximum number of requests per second that the second replicated is able to accept based, at least in part, on the second backlog,
  and wherein setting the maximum number of requests per second that the group of replicated nodes is able to accept comprises setting the maximum number of requests per second that the group of replicated nodes is able to accept to include the maximum number of requests per second that the second replicated is able to accept.

6. One or more non-transitory computer-readable media as recited in claim 1, wherein:
  the first backlog includes a higher backlog than the second backlog;
  calculating the maximum number of requests per second that the group of replicated nodes is able to accept comprise calculating a maximum number of requests per second that the first replicated is able to accept based, at least in part, on the first backlog; and
  further storing computer-executable instructions that, when executed, cause the one or more processors to perform an act comprising:
    based at least in part on determining that the first backlog and the second backlog are both less that the threshold amount, setting the maximum number of requests per second that the group of nodes is able to accept to include the maximum number of requests per second that the first replicated node is able to accept.

7. One or more non-transitory computer-readable media storing computer-executable instructions that, when executed, cause one or more processors to perform acts comprising:
  calculating, for a group of nodes that includes at least a first node and a second node, an amount of work that the group of nodes is able to accept based at least in part on a first backlog of a first node of the group of nodes and a second backlog of a second node of the group of nodes, wherein the first node and the second node in the group of nodes replicates processing of the work that the group of nodes accepts; and
  based at least in part on the first backlog of the first node of the group of nodes being greater than a threshold amount:
    determining that the first node is in a recovery mode;
    calculating an amount of work that the second node is able to accept based at least in part on a second backlog of the second node, the second backlog including a highest backlog from among backlogs of nodes that are not in the recovery mode;
    setting the amount of work that the group of nodes is able to accept to include the amount of work that the second node is able to accept;
    computing a size of the first backlog of the first node of the group of nodes at a first time;
    re-computing the size of the first backlog of the first node of the group of nodes at a second, later time;
    comparing the first backlog of the first node of the group of nodes at the first time with the first backlog of the first node of the group of nodes at the second, later time to determine that the first backlog of the first node of the group of nodes has increased or decreased; and
    adjusting the amount of work that the group of nodes is able to accept based at least in part on determining that the first backlog of the first node of the group of nodes increased or decreased.

8. One or more non-transitory computer-readable media as recited in claim 7, wherein the calculating of the amount of work that the group of nodes is able to accept comprises:
  receiving an indication of the first backlog of the first node and an indication of the second backlog of the second node;
  identifying that the first node has a highest current backlog based at least in part on the first backlog and the second backlog;
  calculating an amount of work that the first node having the highest current backlog is able to accept; and
  setting the amount of work for the first node having the highest current backlog as the amount of work that the group of nodes is able to accept.

9. One or more non-transitory computer-readable media as recited in claim 7, wherein the adjusting the amount of work that the group of nodes is able to accept comprises restricting the amount of work that the group of nodes is able to accept based at least in part on determining that the first backlog of the first node of the group of nodes has increased between the first time and the second, later time.

10. One or more non-transitory computer-readable media as recited in claim 7, wherein:
  the work processed by the group of nodes comprises a series of requests;
  the first node and the second node both process the requests sequentially according to a number associated with an individual request of the series of requests;
  the computing of the size of the first backlog of the first node of the group of nodes at the first time comprises determining a difference between a number associated with a most recent request received by the first node of the group of nodes at the first time and a number associated with a request processed by the first node of the group of nodes at the first time;
  the re-computing of the size of the backlog of the first node of the group of nodes at the second, later time comprises determining a difference between a number associated with a most recent request received by the first node of the group of nodes at the second, later time and a number associated with a request processed by the first node of the group of nodes at the second, later time; and the comparing comprises determining that the difference at the first time is greater or less than the difference at the second, later time.

11. One or more non-transitory computer-readable media as recited in claim 7, wherein the group of nodes form at least a portion of a storage service that receives requests to write data to the storage service, and wherein the first node and the second node of the group of nodes write the data associated with the received requests to the respective node.

12. One or more non-transitory computer-readable media as recited in claim 7, further storing computer-executable instructions that, when executed, cause the one or more processors to perform an act comprising repeating the computing, the re-computing, and the adjusting until the first backlog of the first node of the group of nodes is less than the threshold amount for a threshold amount of time.

13. One or more non-transitory computer-readable media as recited in claim 7, wherein the first node includes a master node and second node includes a peer node, wherein the master node sets the rate at which the group of nodes is able to accept the amount of work.

14. A method comprising:
under control of one or more computer systems configured with specific executable instructions,
receiving requests to perform work within a distributed service that performs the work using at least a first node and a second node of multiple nodes of the distributed service;
determining that a first backlog of the first node and a second backlog of the second node are less than a threshold;
based at least in part on the determining that the first backlog and the second backlog are less than the threshold, operating the distributed service in a first mode;
setting a first rate at which the distributed service accepts the requests to perform the work using a first algorithm when the distributed service operates in the first mode;
identifying that the first node enters a recovery mode based at least in part on the first backlog of the first node having a higher backlog of received requests than the threshold;
based at least in part on the identifying:
operating the distributed service in a second, different mode;
determining, using a second, different algorithm, a second rate at which the second node is able to accept to the requests based, at least in part, on the second backlog, wherein the second backlog includes a highest backlog from among backlogs of nodes that are not in the recovery mode; and
setting the first rate at which the distributed service accepts the requests to perform the work to include the second rate at which the second node is able to accept the requests.

15. A method as recited in claim 14, wherein the first node comprises a respective replication node that processes the received requests at the respective replication node.

16. A method as recited in claim 14, wherein the multiple nodes reside within a single housing, different housings, or a combination thereof.

17. A method as recited in claim 14, further comprising:
determining that the first backlog of the first node is less than the threshold amount for a threshold amount of time; and
transitioning the distributed service from the second mode to the first mode.

18. A method as recited in claim 14, wherein the first node of the multiple nodes is offline and not processing the received requests during at least a portion of a time when the distributed service operates in the first mode, and further comprising:
placing the first node online to process the received requests; and
transitioning the distributed service from the first mode to the second mode at least partly in response to placing the first node online.

19. A method as recited in claim 14, further comprising:
calculating a cap for the first rate with reference to the first node of the multiple nodes, first node having a higher amount of the received requests to process that the second node; and
imposing the cap on the first rate, wherein the cap is the first rate for the first node.

20. A method as recited in claim 14, further comprising:
determining that the first backlog of the first node has increased or decreased; and
imposing a cap on the first rate at least partly in response to determining that the first backlog of the first node increased during the first time period.

21. A method as recited in claim 20, further comprising:
tightening the cap on the first rate at least partly in response to determining that the first backlog of the first node increased; or
relaxing the cap on the first rate at least partly in response to determining that the first backlog of the first node decreased.

22. A method as recited in claim 14, wherein the first node includes a master node and the second node includes a peer node, and wherein the master node sets the first rate at which the distributed service accepts the requests to perform the work.

23. A method as recited in claim 22, further comprising:
receiving, at the master node and from the peer node, an indication of an amount of received requests that the peer node has yet to process when the distributed service operates in the first mode; and
receiving, at the master node and from the peer node, an indication of which particular received request of the received requests the peer node is currently processing when the distributed service operates in the second mode.

24. One or more computing devices comprising:
one or more processors; and
one or more computer-readable media storing computer-executable instructions that, when executed, cause the one or more processors to perform acts comprising:
processing sequential requests received at a distributed service, wherein individual requests of the sequential requests are replicated by at least a first computing device and a second computing device of the distributed service;
operating the distributed service in a first mode to provide, from the first computing device to the second computing device, an indication of a first backlog of sequential requests yet to be processed at the first computing device, wherein the distributed service is configured to operate in the first mode in response to determining that the first backlog of sequential requests of the first computing device and a second backlog of sequential requests of the second computing device is less than a predetermined threshold; and based at least in part on the first computing device entering a recovery mode:

operating the distributed service in a second, different mode to provide, from the first computing device to the second computing device, an indication of which request of the sequential requests the first computing device is currently processing; and setting a rate at which the distributed service receives the sequential requests during the second, different mode based at least in part on the second backlog of sequential requests that the second computing device has yet to process, wherein the second backlog of sequential requests includes a highest backlog from among backlogs of computing devices of the distributed service that are not in the recovery mode.

25. One or more computing devices as recited in claim 24, wherein an individual request of the sequential requests is associated with a log sequence number (LSN), and wherein the providing of the indication in the second mode comprises providing from the first computing device to the second computing device an LSN of the sequential request that the first computing device is currently processing.

26. One or more computing devices as recited in claim 24, wherein the first computing device enters the recovery mode based at least in part on the first computing device beginning the processing of the sequential requests after previously refraining from processing the sequential requests.

27. One or more computing devices as recited in claim 24, wherein the first computing device enters the recovery mode based at least in part on the first backlog of sequential requests of the first computing device exceeding the predetermined threshold.

28. One or more computing devices as recited in claim 24, wherein the first computing device enters the recovery mode based at least in part on the first backlog of sequential requests of the first computing device exceeding the predetermined threshold for a predetermined amount of time.

29. One or more computing devices as recited in claim 24, the acts further comprising:

imposing a cap on the rate at which the distributed service receives the sequential requests during the second mode; and based at least in part on imposing the cap:

relaxing the cap on the rate at which the distributed service receives the sequential requests based at least in part on the first backlog of sequential requests of the first computing device in the recovery mode decreasing; and tightening the cap on the rate at which the distributed service receives the sequential requests based at least in part on the first backlog of sequential requests of the first computing device in the recovery mode increasing.

30. One or more computing devices as recited in claim 24, the acts further comprising:

determining a rate at which the second node is able to receive the sequential requests based, at least, in part, on the second backlog of sequential requests, and wherein setting the rate at which the distributed service receives the sequential requests comprises setting the rate at which the distributed service receives the sequential requests to include the rate at which the second node is able to receive the sequential requests.

* * * * *